July 11, 1961 L. BAUMSTEIN ET AL 2,992,316
POP-UP BABY BOTTLE WARMER
Filed Feb. 24, 1960
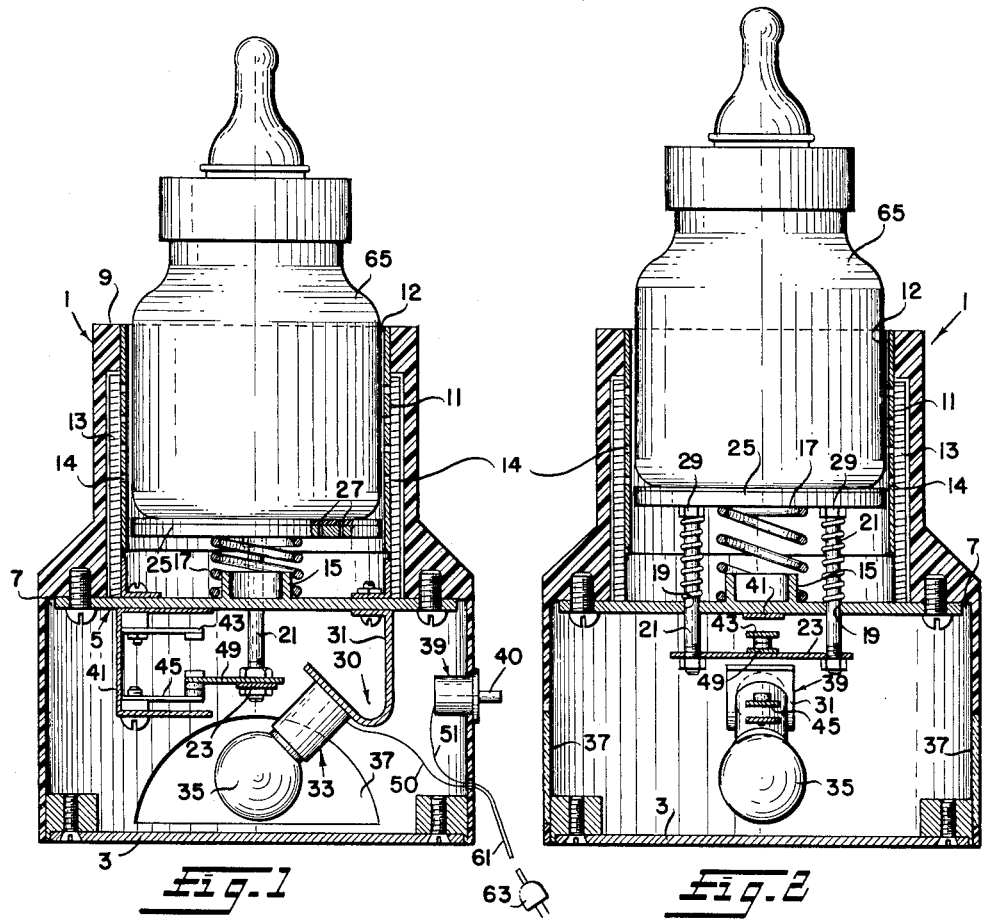
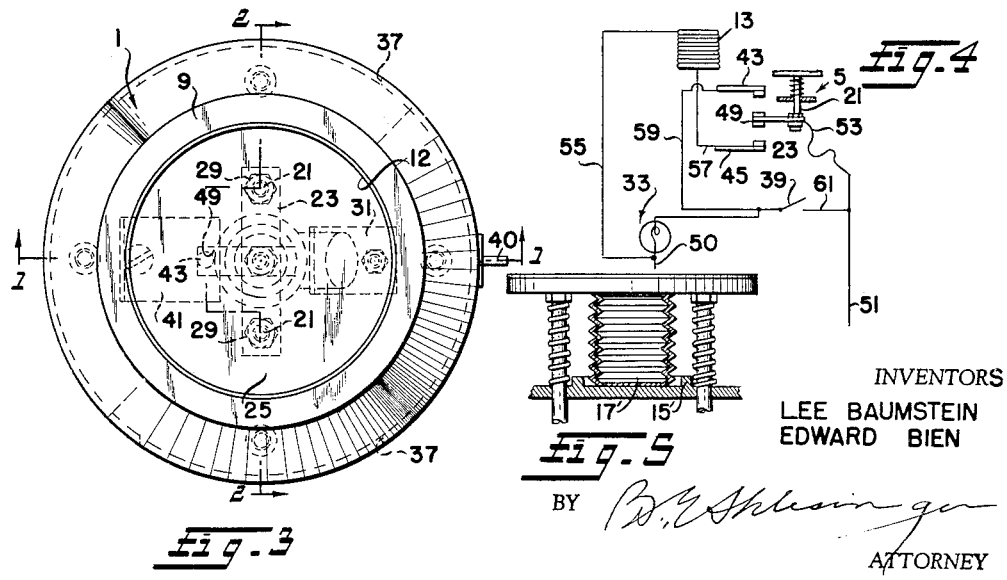
INVENTORS
LEE BAUMSTEIN
EDWARD BIEN
BY
ATTORNEY

United States Patent Office 2,992,316
Patented July 11, 1961

2,992,316
POP-UP BABY BOTTLE WARMER
Lee Baumstein, 6611 Lindley Ave., Reseda, Calif., and Edward Bien, 14968 Greenleaf St., Sherman Oaks, Calif.
Filed Feb. 24, 1960, Ser. No. 10,628
11 Claims. (Cl. 219—43)

This invention relates to new and useful improvements in bottle warming apparatus.

More particularly, the present invention proposes the construction of an improved bottle warmer which can be used to make infant or invalid feeding and food storage convenient, compact and quick at night and other times when a kitchen is inconvenient to get to or unavailable.

Another object of the invention is to provide a bottle warmer which can be operated merely by placing the bottle to be warmed in the bottle warmer.

Another object of this invention is to provide a bottle warmer which will keep the bottle at heated temperature as long as the bottle remains in the warmer.

Another object of this invention is to provide a bottle warmer in which the weight of the bottle placed in the bottle warmer will actuate the warmer to produce repeated cycles of heating.

Another object of this invention is to produce a bottle warmer which remains inoperative and unheated until a bottle is placed therein and which may remain plugged or connected to the electrical supply when not in use.

Another object of this invention is to produce a bottle warmer which will raise the bottle from the bottom of the warming well thereof when the bottle is at heated temperature as a signal that the bottle is sufficiently heated and to facilitate extracting the bottle therefrom.

Another object of this invention is to provide a bottle warmer having a signal lamp which lights up at the end of each heating cycle as a signal of its completion and to provide a bottle warmer having a signal lamp which may be used alternatively as a night light when the bottle warmer is not in operation.

Another object of this invention is to provide a bottle warmer in which heating occurs in continuing cycles, intemittent heating periods being interspersed with cooling periods, so long as a bottle remains in the bottle warmer, and in which the height or position of the bottle in the warmer is an indication of the temperature of the bottle at that time.

Bottle warmers heretofore in use are capable of heating a bottle to a constant temperature but are unsatisfactory for ease of operation and determination of the bottle temperature at a glance. The art prior to the present bottle warmer fails to satisfactorily fulfill the other above mentioned objects of this invention. Pop-up toasters have been devised which have a temperature expansive element for raising the toast but toasters are designed for a single cycle operation and are incapable of repetitive cycles of operation without manual removal and reinsertion of the toast. Therefore, this type of toaster will not accomplish the objectives of this invention.

For other objects and advantages of the invention, reference is made to the following specifications, in connection with the accompanying drawings, in which:

FIGURE 1 is a vertical cross sectional view of the bottle warmer in the lowered position with a bottle therein taken through the center thereof along lines 1—1 in FIGURE 3;

FIGURE 2 is a vertical cross sectional view of the bottle warmer taken along lines 2—2 of FIGURE 3 showing the bottle warmer in the raised position with a bottle therein;

FIGURE 3 is a top plan view of the bottle warmer without the bottle therein;

FIGURE 4 is a systematic and diagrammatic view showing a possible wiring arrangement and showing the bottle warmer in the intermediate position.

FIGURE 5 is a fragmentary vertical cross sectional view of the bottle warmer showing a modification thereof.

The bottle warmer has a housing 1 which is generally of cylindrical shape. Bottom plate 3 covers the bottom end of housing 1 and a circular support plate 5 is mounted by appropriate screws to a circular flange dividing housing 1 on the inside thereof intermediate its length. Mounted on support plate 5 and extending thereabove to and received by a lip 9 at the top of housing 1 is circular wall 11 which encloses a circular strip heating element 13 between itself and housing 1. Wall 11 is perforated throughout by holes 14 for better heat communication therethrough. Heating element 13 extends from lip 9 of housing 1 down to support plate 5. Circular wall 11 and support plate 5 form a well 12 into which a bottle 65 or other type of container may be inserted to fill substantially the entire well. Support plate 5 carries a circular, centrally-located, upstanding ridge 15 which nestingly receives thermostatic coil 17 around the outside thereof. Thermostatic coil or temperature responsive expansion element 17 is temperature responsive to expand upwardly from support plate 5 at a temperature of about 170° F. to reach a position as shown at 17' in FIGURE 2.

Extending through and in slidable engagement with openings 19 in support plate 5 are two vertical rods 21 shown in FIGURE 3. Rods 21 are rigidly interconnected at their lower ends by horizontal strut 23 extending therebetween. Referring again to FIGURE 1, mounted on the upper end of rods 21 is circular plunger or platform 25 which extends across the entire area encompassed by wall 11. Platform 25 contains perforations 27 therethrough. Encircling each of rods 21 between platform 25 and support plate 5 are coil compression springs 29 which bias platform 25, when no weight is placed thereon, to a position intermediate to the lowered position shown in FIGURE 1 and the raised position shown in FIGURE 2. The weight of a bottle 65 on platform 25 is sufficient to overbalance springs 29 and allow platform 25 to be pushed down by the weight of the bottle to the lowered position as shown in FIGURE 1 where platform 25 comes to rest on thermostatic coil 17 in its contracted position. While springs 29 are shown extending upwards to platform 25 and assisting coil 17 in maintaining the platform in the raised position in FIGURE 2 it can be seen that springs 29 need not extend upwards this far in their extended or relaxed position nor assist in support of platform 25 in the raised position, their primary purpose being to bias the platform to the intermediate position when no bottle is on the platform.

Depending from support plate 5 is a signal lamp 30 comprising a bracket 31 which supports an electric light bulb socket 33 containing a light bulb 35. Four openings covered with translucent plastic sheeting such as at 37 are provided in the bottom of housing 1 so that the light from light bulb 35 will communicate to the outside thereof. Secured to the lower part of housing 1 and extending through the wall thereof is switch 39 having a lever 40 for actuation thereof to turn light 35 on and off as later described.

Also depending from support plate 5 into the lower section of housing 1 is bracket 41 having an upper contact 43 and a lower contact 45 insulatedly secured thereto. Contacts 45 and 43 extend towards the center of housing 1, one directly above the other. Mounted on strut 23 midway between rods 21 is contact 49 which extends outwardly therefrom to a position between contacts 43 and 45 so that, when rods 21 and strut 23 are in a lowered position as shown in FIGURE 1, contact 49 contacts lower contact 45 and, when rods 21 and strut 23 are in a raised position as in FIGURE 2, contact 49 contacts upper contacts 43.

Lamp 33, switch 39, heating coil 13 and switch 41 are electrically connected so that when the platform 25 and consequently rods 21 are in the lowered position, heating coil 13 will be energized to heat well 12 and bottle 65 therein. When platform 25 is raised from the lowered position, the heating element will be de-energized and, when platform 25 reaches the raised position, lamp 33 will light.

It is also desired that lamp 33 will light when switch 39 is closed regardless of the position of platform 25. One way of accomplishing this is shown in the diagram of FIGURE 4. Power lines or wires 50 and 51 are connected with a source of electrical power. Flexible wire 53 connects power line 51 to contact 49 on strut 23. Strip heating element 13 is connected to power line 50 by wire 55 and to contact 45 by wire 57.

Thus, when contact 49 is in the lowered position and in contact with contact 45, strip heating element 13 is energized. Power line 50 is connected through lamp 33 by line 59 to upper contact 43. Thus, when contact 49 is in the raised position, contacting contact 43, lamp 33 is lit. A shunt 61 is provided between lines 59 and power lines 51 in which switch 39 is interposed so that, when switch 39 is closed, lamp 33 will be lit independently of the position of contact 49 and thus of platform 25.

*Operation*

Power lines 50 and 51 are connected to a source of electrical energy through an electrical cord 61 and plug 63, the cord and plug being the means of connecting the entire device electrically to a current source. When this is accomplished, the bottle warmer is ready for use. When no bottle is within the warmer, springs 29 will support platform 25 in an intermediate position between the lowered position and the raised position. At this point, contact 49 is neither in contact with upper contact 43 nor lower contact 45 and thus neither heating element 13 nor lamp 33 are energized. This position is illustrated in FIGURE 4 where the platform and switch contact 49 adjunct thereto is shown in the intermediate position. In this condition, if it is desired to use the bottle warmer as a night light, switch 39 may be turned on by operation of lever 14 to turn on lamp 33.

When it is desired to heat a bottle such as 65, it is placed in the well 12 and seated on platform 25. The weight of the bottle 65 will overcome springs 29 to push platform 25 down into the lower position seating on coil 17 which is now cool and where contact 49 is in contact with lower contact 45, whereby strip heating element 13 is energized to heat the well and the bottle therein. When the temperature in the well reaches 170° F. thermostatic coil 17 expands upwardly with sufficient force to push platform 25 up away from the lowered position, disconnecting the heating element circuit. Due to the lag in heat conduction from the heating element to the interior of the wall caused by the wall 11 and support plate 5, the temperature within the well will continue to rise or at least stay constant after the heating element is de-energized and thermostatic coil 17 will continue to expand upwardly until platform 25 reaches the raised position as shown in FIGURE 2 and contact 49 comes into contact with upper contact 43, closing the circuit to lamp 33. Lamp 33 thus gives a signal that the heating cycle has been completed and that the bottle is up to heated temperature.

If the bottle is taken out at this point, the well will cool off and the thermostatic coil 17 will contract downwardly lowering platform 25 to the intermediate position where it is biased solely by springs 29.

If the bottle 65 is left on the platform after the cycle is completed, as the thermostatic coil 17 cools and contracts due to the lowering temperature in the well, platform 25 will be lowered until it again reaches the lowered position and the strip heating element 13 is again energized to reheat the well. Thus, until the bottle is removed from the well, the cycle will be continuously repeated.

During the cycle, the relative height of the bottle in the warmer well is an indication of the temperature of the bottle. It may be desired to remove the bottle from the warming well when it reaches a given height in the warming well during its upward movement, yet, before it reaches the raised position. When the bottle warmer is used in this manner, the height of the bottle may be used to gauge more accurately the bottle temperature which may be desired.

The cycle time is the function of the strength and intensity of heat from the heating element, the size of a bottle to be heated, the arrangement of the switch for the heating element circuit and the arrangement and temperature-expansion characteristics of the temperature responsive expansion element employed. By variations in designs of these elements of the bottle warmer, a cycle time may be obtained that is most satisfactory for convenient operation.

It can be readily seen that many modifications can be made in the bottle warmer within the scope of the invention.

Springs 29 are preferred for biasing platform 25 to a position intermediate of the lowered and raised positions when there is no bottle on the platform. However, any other yielding support may be used to fulfill this function.

The distance between the raised and lowered positions of the platform may be varied to any extent desired by the proper choice of the temperature responsive expansion element and by appropriate design of the platform mounting such as rods 21.

The bottle warmer may be simplified to exclude the signal light and the switching means for the signal light. Although these components comprise part of the novelty of the application, they are not absolutely essential for satisfactory operation of the warmer. Thus, the bottle warmer could contain just the heating element circuit with a switch therein operated by the lowering of the platform.

Switch 41 may take many forms such as a simple double throw switch operated by an arm extending from a rod such as 21.

The size and shape of the heating well may be changed to accommodate the desired bottle or object that is to be heated and may be designed to completely enclose the bottle to be heated. It is, however, desirable to have the well deep enough to prevent tipping and falling of the bottle inserted in the well.

The strip heating element proposed surrounds the well 12 but may be placed in any convenient manner within the housing 1 so as to heat well 12.

Any temperature responsive expansion element may be used in the place of thermostatic coil 17 and may be arranged in any convenient manner so as to displace platform 25 upward when the desired well temperature is reached. Many bimetallic strips, expanding coils, pistons and the like are known in the art which may fulfill this purpose and which may be used with equal facility. It is preferred to use a circular expansion element placed in the center of the well so as to more uniformly sense the well temperature. The expansion element should have the proper expansion characteristics so as to expand at the selected heated temperature for the well.

The specific type of temperature responsive expansion element preferred by us, a thermostatic bellows, is shown in FIGURE 5. In this embodiment, a bellows 17' replaces the coil 17 shown in FIGURE 1. An upstanding ridge 15' nesting the receives bellows 17'. Bellows 17' may be made of any material that is elastic enough to allow the bellows to expand properly. A volume of gas is enclosed within the bellows. Upon application of heat through the warming well, the gas within the bellows expands, thus causing the bellows to expand upwardly to raise the platform. When the warming well cools off, the bellows will contract downwardly in a similar manner.

Platform 25 is shown in a circular configuration. The purpose of the platform is to support the bottle placed thereon and to act as a seat for the expansion element and the biasing springs. It may therefore be designed in any convenient manner to fulfill these purposes.

While the invention has been described in connection with different embodiments thereof, it will be understood that it is capable of further modifications and this application is intended to cover any variations, uses, or adaptations of the invention following in general, the principles of the invention and including such departures from the present disclosures as come within known or customary practice in the art to which the invention pertains, and as may be applied to the essential features hereinbefore set forth and as fall within the scope of the invention or the limits of the appended claims.

Having thus described my invention what I claim is:

1. In a pop-up bottle warming device, a warming well having an electrical heating element therein for heating said well, a platform moveably mounted for raising and lowering in said well, said platform having a lowered position in said well, means for biasing said platform to a position above said lowered position, whereby, when a bottle is placed on said platform, said supporting means is overcome by the weight of the bottle, allowing said platform to be lowered to said lowered position, an electrical circuit for supplying current to said heating element, a switch in said circuit for closing said circuit when said platform is in the lowered position and opening said circuit when said platform is raised from the lowered position, means cooperating with said platform for operating said switch to close said circuit when said platform is in the lowered position and to open said switch when said platform is raised from the lowered position and a temperature responsive expansion element engageable with said platform to raise and support said platform and the bottle placed on said platform above said lowered position by expansion thereof, said expansion element being spaced in heat transfer relation with said heating element so that said expansion element expands to raise said platform and bottle from said lowered position when said well reaches heated temperature and to support said platform and bottle thereabove so long as said well remains at heated temperature and contracts to lower said platform and bottle back to said lowered position when the temperature in said well falls below heated temperature.

2. In a pop-up bottle warming device as in claim 1 in which said means cooperating with said platform for operating said switch includes a rod extending from said platform to said switch for operation thereof.

3. In a pop-up bottle warming device, a warming well having an electrical heating element therein for heating said well, a platform movably mounted for raising and lowering in said well, said platform mounted on at least one rod, said rod movably mounted for vertical movement in said well, said platform having a lowered, an intermediate and a raised position in said well, a coil spring surrounding said rod mounted to bias said platform to the intermediate position, said spring being yieldable, whereby, when a bottle is placed on said platform, said biasing spring is overcome by the weight of the bottle, allowing said platform to be lowered to said lowered position, an electrical contact mounted on said rod, upward contact mounted in said well above said rod mounted contact and engageable with said rod mounted contact when said platform is in the raised position, a lowered electrical contact mounted below said rod mounted contact engageably with said rod mounted contact when said platform is in the lowered position, an electrical circuit connected to said rod mounted contact and said lower contact for supplying current to said heating element, a signal lamp for indicating the completion of the heating cycle, another electrical circuit through said rod mounted contact and said upper contact for supplying the current to said lamp, and a temperature responsive expansion element engageable with said platform and expansible to raise said platform from said lowered position to said raised position when said well is above the heated temperature.

4. In a pop-up bottle heating device, a cylindrical housing, a support plate mounted within said housing intermediate its length, a cylindrical wall spaced concentrically to and within said housing and extending from said support plate to the top of said housing and with said support plate forming a well within said housing, a strip heating element surrounding said wall between said wall and said housing and extending from said support plate to the top of said housing, a thermostatic coil secured to said support plate at the center of said housing for expansive movement toward the top of said housing, a pair of rods vertically slidably mounted in said support plate for movement therethrough in a direction parallel to said wall, a platform in said well secured to the upper ends of said rods, said platform having a lowered position, an intermediate position and a raised position in said well, a coil spring surrounding each of said rods, extending between said platform and said support plate and mounted to bias said platform to said intermediate position, said springs being yieldable whereby when a bottle is placed on said platform, said biasing springs are overcome by the weight of the bottle, allowing said platform to be lowered to said lowered position, a strut rigidly connecting one of said rods to the other of said rods below said support plate, an electrical contact secured to and extending from said strut, a bracket secured to and appending below said support plate, an upper electrical contact insulatedly mounted on said bracket and engageable with said rods mounted contact when said platform is in said raised position, a lower electrical contact mounted on said bracket and engageable with said rod mounted contact when said platform is in said lowered position, another bracket secured to and appending from said support plate, an electrical lamp mounted in said another bracket, an electrical circuit connected through said strut mounted contact and said lower contact for supplying current to said heating element when said platform is in the lowered position, an electrical circuit connected through said strut mounted contact and said upper contact for supplying current to said signal lamp when said platform is in said raised position, said thermostatic coil being expansible to raise said platform from said lowered position to said raised position when said well is at the heated temperature, said housing having openings therein below said support plate to allow said lamp to shine to the outside thereof.

5. In a pop-up bottle heating device as in claim 4 which includes a manually operated switch mounted on and extending to the outside of said housing and another circuit for supplying current to said signal lamp, said manually operated switch interposed in said another circuit for opening and closing thereof for operation of said signal lamp independently of said lamp circuit.

6. A bottle warming device comprising a container receiving platform movable between raised and lowered positions, said platform normally positioned when in nonuse in the raised position, said platform having means responsive to the weight of the container when said container is placed on said platform to depress said platform, to said lowered position, means for applying heat to said container when said platform is in lowered position, a temperature responsive element engageable with said platform to raise and support said platform and the container thereon above said lowered position, said element spaced in heat transfer relation with said heat applying means so that, when heated to a preselected temperature, said element raises said platform and container above said lowered position and supports said platform and container thereabove so long as the element remains at said preselected temperature and lowers said platform when the temperature of said element falls below that preselected, thereby reapplying heat to said container and means for cutting off said heat applying means when said platform and container are raised to said raised position.

7. In a pop-up bottle warming device, a warming well having an electrical heating element therein for heating said well, a platform moveably mounted for raising and lowering in said well, said platform having a lowered position in said well, means for biasing said platform to a position above said lowered position, whereby, when a bottle is placed on said platform, said supporting means is overcome by the weight of the bottle, allowing said platform to be lowered to said lowered position, an electrical circuit for supplying current to said heating element, a switch in said circuit for closing said circuit when said platform is in the lowered position and opening said circuit when said platform is raised from the lowered position, means cooperating with said platform for operating said switch to close said circuit when said platform is in the lowered position and to open said switch when said platform is raised from the lowered position, means cooperating with said platform for operating said switch to close said circuit when said platform is in the lowered position and to open said switch when said platform is raised from the lowered position and temperature responsive means for raising said platform from said lowered position and supporting said platform above said lowered position when said well is at the heated temperature, said temperature responsive means including an expansion element positioned in the center of said well below said platform, engageable with said platform and expandible upwardly to raise said platform from said lowered position and support said platform above said lowered position when said well is at heated temperature.

8. In a pop-up bottle warming device, a warming well having an electrical heating element therein for heating said well, a platform moveably mounted for raising and lowering in said well, said platform having a lowered position in said well means for biasing said platform to a position above said lowered position, whereby, when a bottle is placed on said platform, said supporting means is overcome by the weight of the bottle, allowing said platform to be lowered to said lowered position, and electrical circuit for supplying current to said heating element, a switch in said circuit for closing said circuit when said platform is in the lowered position and opening said circuit when said platform is raised from the lowered position, means cooperating with said platform for operating said switch to close said circuit when said platform is in the lowered position and to open said switch when said platform is raised from the lowered position, temperature responsive means for raising said platform from said lowered position and supporting said platform above said lowered position when said well is at the heated temperature, said platform having a raised position in said well above said yielding support position, said means for raising and supporting said platform raising said platform to said raised position when said well is at heated temperature, a signal lamp for indicating the completion of a heating cycle, a circuit for supplying a current to said signal lamp, a switch in said lamp circuit for closing said lamp circuit when said platform is in the raised position and opening said lamp circuit when said platform is lowered from the raised position and means cooperating with said platform for operating said lamp switch to close said circuit when said platform is in the raised position and to open said lamp switch when said platform is lowered from said raised position.

9. In a pop-up bottle warming device as in claim 8 in which said lamp circuit contains a manually operated switch for manually closing said lamp circuit to operate said lamp independently of said lamp switch.

10. In a pop-up bottle warming device, a warming well having an electrical heating element therein for heating said well, a platform movably mounted for raising and lowering in said well, said platform having a lowered position in said well, means for biasing said platform to a position above said lowered position, whereby, when a bottle is placed on said platform, said supporting means is overcome by the weight of the bottle, allowing said platform to be lowered to said lowered position, an electrical circuit for supplying current to said heating element, a switch in said circuit for closing said circuit when said platform is in the lowered position and opening said circuit when said platform is raised from the lowered position, means cooperating with said platform for operating said switch to close said circuit when said platform is in the lowered position and to open said switch when said platform is raised from the lowered position and temperature responsive means for raising said platform from said lowered position and supporting said platform above said lowered position when said well is at the heated temperature, said platform being supported by at least one rod vertically movably mounted in said well, said rod extending to and operating said heating element circuit switch to close said heating element circuit when said platform is in the lowered position and to open said switch when said platform is raised from the lowered position.

11. In a pop-up bottle warming device as in claim 10 in which said rod is mounted within a coil spring, said coiled spring mounted in said well for biasing said platform to a position above said lowered position when there is no bottle on said platform.

References Cited in the file of this patent
UNITED STATES PATENTS

| | | |
|---|---|---|
| 2,562,991 | Rothschild | Aug. 7, 1951 |
| 2,782,782 | Taylor | Feb. 26, 1957 |
| 2,790,378 | Zander | Apr. 30, 1957 |
| 2,835,192 | Sivacek | May 20, 1958 |